(12) United States Patent
Zhuang et al.

(10) Patent No.: US 8,892,140 B2
(45) Date of Patent: Nov. 18, 2014

(54) BI-DIRECTIONAL TRAINING IN DUAL NETWORKS SYSTEM

(75) Inventors: Binnan Zhuang, Evanston, IL (US); Weimin Xiao, Hoffman Estates, IL (US); Philippe Sartori, Algonquin, IL (US); George Calcev, Hoffman Estates, IL (US); Fei Teng, Evanston, IL (US)

(73) Assignee: Futurewei Technologies, Inc., Plano, TX (US)

( * ) Notice: Subject to any disclaimer, the term of this patent is extended or adjusted under 35 U.S.C. 154(b) by 273 days.

(21) Appl. No.: 13/603,352

(22) Filed: Sep. 4, 2012

(65) Prior Publication Data

US 2014/0066113 A1 Mar. 6, 2014

(51) Int. Cl.
*H04B 7/00* (2006.01)

(52) U.S. Cl.
USPC ............ 455/501; 455/114.2; 455/278.1; 375/260; 375/346; 370/292

(58) Field of Classification Search
USPC .......... 455/501, 63.1, 114.2, 278.1, 296; 375/144, 350, 260, 346; 370/292
See application file for complete search history.

(56) References Cited

U.S. PATENT DOCUMENTS

| | | | |
|---|---|---|---|
| 7,453,855 B1* | 11/2008 | Madhow | 370/335 |
| 7,545,893 B2* | 6/2009 | He | 375/346 |
| 7,660,231 B2* | 2/2010 | Tulino | 370/203 |
| 8,144,668 B1* | 3/2012 | Madhow | 370/335 |
| 8,618,798 B2* | 12/2013 | Somasundaram et al. | 324/307 |
| 2004/0014501 A1* | 1/2004 | Kuwahara et al. | 455/561 |

* cited by examiner

*Primary Examiner* — Dominic E Rego
(74) *Attorney, Agent, or Firm* — Slater & Matsil, L.L.P.

(57) ABSTRACT

A method and apparatus for bi-direction training in D2D/cellular networks. An embodiment method includes sending training symbols to sense interference from the cellular UEs, calculating an interference subspace from the cellular UE to each of the D2D UEs, calculating an orthogonal projection matrix based on the interference subspace calculated, and iteratively updating receive filters through forward training and transmit beamformers through backward training after the orthogonal projection matrix is calculated to align the D2D UEs. In an embodiment, training symbols are sent to sense interference from the cellular UE.

32 Claims, 8 Drawing Sheets

TRAINING LENGTH > $N_u(K+L)$
IF $K \le N_u$, ONLY ONE ITERATION IS NEEDED

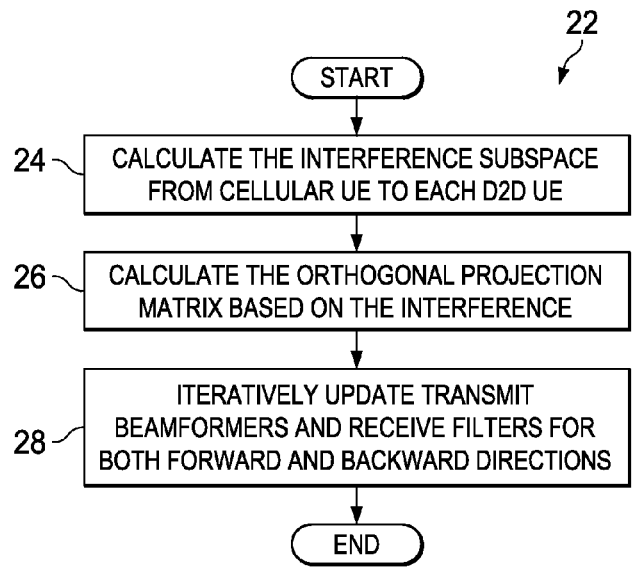

FIG. 3

Algorithm 1 Bi-directional Beamforming

1: for $i = 1$ to $K$, $l = 1,2$ do
2:   Calculate $A(i,l)$ using (9).
3:   Calculate $Q(i,l)$ using (10).
4: end for
5: Initialize with random $g(i,l)$, $i = 1$ to $K, l = 1,2$ in the subspace spanned by $Q(i,l)$
6: while $g(i,l)$, $i = 1$ to $K, l = 1,2$ have not converged do
7:   for $i = 1$ to $K$ do
8:     Calculate $B_v(i,l)$, $i = 1$ to $K, l = 1,2$ using (11).
9:     Update the transmit beamformer $v(i,l)$, $i = 1$ to $K, l = 1,2$ using (12).
10:  end for
11:  for $i = 1$ to $K$ do
12:    Calculate $B_g(i,l)$, $i = 1$ to $K, l = 1,2$ using (13).
13:    Update the receive filter $g(i,l)$, $i = 1$ to $K, l = 1,2$ using (14).
14:  end for
15: end while
16: for $i = 1$ to $K, l = 1,2$ do
17:   Normalize the transmit beamformer $v(i,l) = \frac{v(i,l)}{\|v(i,l)\|}$
18: end for

FIG. 4

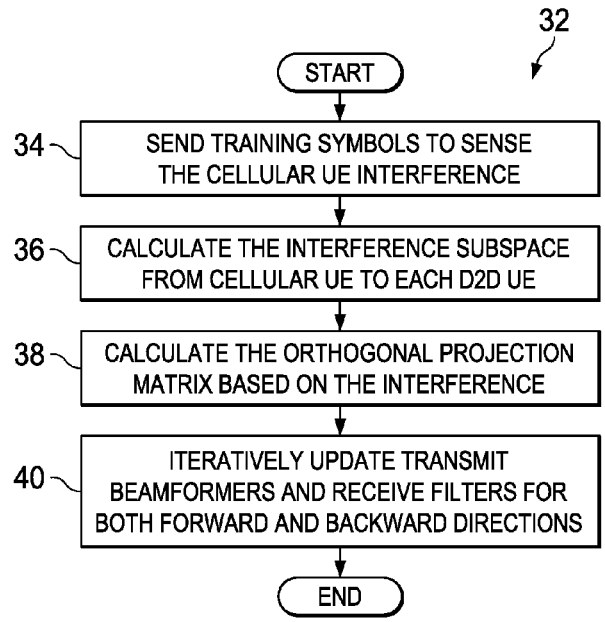

FIG. 5

Algorithm 2 Training-based Bi-directional Beamforming

1: for $i$ = 1 to $K$, $l$ = 1,2 do
2:    Sensing the cellular interference at D2D UE $(i,l)$ using (15).
3:    Estimate the cellular interference subspace $A(i,l)$ using (16).
4:    Calculate the orthogonal projection matrix $Q(i,l)$ using (10).
5: end for
6: Initialize with random $g(i,l)$, $i$ = 1 to $K$, $l$ = 1,2 in the subspace spanned by $Q(i,l)$
7: while $v(i,l)$, $g(i,l)$, $i$ = 1 to $K$, $l$ = 1,2 have not converged do
8:    Two D2D UEs of each pair alternatively send training symbols $\chi(i,l)$ to each other using $\bar{g}(i,l)$.
9:    for $i$ = 1 to $K$, $l$ = 1,2 do
10:      Upon receiving $y_v(i,l)$ in (17), estimate $v(i,l)$ using (18).
11:    end for
12:    Two D2D UEs of each pair alternatively send training symbols $\chi(i,l)$ to each other using $\bar{v}(i,l)$.
13:    for $i$ = 1 to $K$, $l$ = 1,2 do
14:      Upon receiving $y_g(i,l)$ in (19), estimate $g(i,l)$ using (20).
15:    end for
16: end while
17: for $i$ = 1 to $K$, $l$ = 1,2 do
18:    Normalize the transmit beamformer $v(i,l) = \dfrac{v(i,l)}{\|v(i,l)\|}$
19: end for

BI-DIRECTIONAL TRAINING IN DUAL NETWORKS SYSTEM

TECHNICAL FIELD

The present disclosure relates to dual networks system and, in particular embodiments, to interference management and resource allocation in for example D2D/cellular networks.

BACKGROUND

In the field of wireless communication, there has been increasing demand for heterogeneous networks where different types of network controllers and mobile devices communicate with each other. The network controller may be, for example, an evolved NodeB (eNB), a NodeB, a base station, a controller, and the like. According to the transmission power and backhaul capability, the network controller may be known as macro cell, low power node (LPN), relay node, pico cell, and so on. In addition, direct device-to-device (D2D) communication may be used to further boost the network capacity. D2D communication refers to a communication mode between two or more user equipments (UEs) that does not include, or does not always include, a network controller in a communication path between or among the UEs. The UEs may be, for example, a mobile station, a communications device, a subscriber, a terminal, and the like.

In a communication network where different types of communication links share a communication resource, they may undesirably interference with each other. For example, when D2D UEs and one or more cellular UEs share an uplink band during communications with the BTS, the D2D UEs and the cellular UE may interfere with each other.

SUMMARY OF THE DISCLOSURE

Technical advantages are generally achieved by embodiments of the present disclosure which provide a method and apparatus for interference management in a network where different communication links share communication resources.

In an embodiment, a method of managing interference in a network including a communication device and device-to-device UE (D2D UE) pairs. The method includes calculating an interference subspace from the communication device to each of the D2D UEs, calculating an orthogonal projection matrix based on the interference subspace calculated, and iteratively updating receive filters through a forward training and transmit beamformers through backward training after the orthogonal projection matrix is calculated to align the D2D UEs.

In an embodiment, a method of managing interference in a network including a cellular user equipment (UE) and device-to-device UE (D2D UE) pairs. The method includes sending training symbols to sense interference from the cellular UE, calculating an interference subspace from the cellular UE to each of the D2D UEs, calculating an orthogonal projection matrix based on the interference subspace calculated, and iteratively updating receive filters through forward training and transmit beamformers through backward training after the orthogonal projection matrix is calculated to align the D2D UEs.

In an embodiment, a device-to-device UE (D2D UE) forming part of a D2D UE pair. The D2D UE includes a processor operatively coupled to a transmitter, to a receiver, and to memory and a bi-directional training module that, when executed by the processor, is configured to calculate an interference subspace from the cellular UE to each of the D2D UEs in the D2D UE pair, to calculate an orthogonal projection matrix based on the interference subspace calculated, and to iteratively update receive filters through forward training and transmit beamformers through backward training after the orthogonal projection matrix is calculated to align the D2D UEs.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 3 provides an embodiment flow diagram of the bi-directional beamforming method of FIG. 2;

FIG. 4 illustrates an embodiment algorithm capable of performing the method of FIGS. 2 and 3;

FIG. 5 illustrates provides an embodiment flow diagram of the bi-directional beamforming method of FIG. 2;

FIG. 6 illustrates a an embodiment algorithm capable of performing the method of FIGS. 2 and 5;

DETAILED DESCRIPTION OF ILLUSTRATIVE EMBODIMENTS

The making and using of the present embodiments are discussed in detail below. It should be appreciated, however, that the present disclosure provides many applicable inventive concepts that may be embodied in a wide variety of specific contexts. The specific embodiments discussed are merely illustrative and do not limit the scope of the disclosure.

Figure 1:
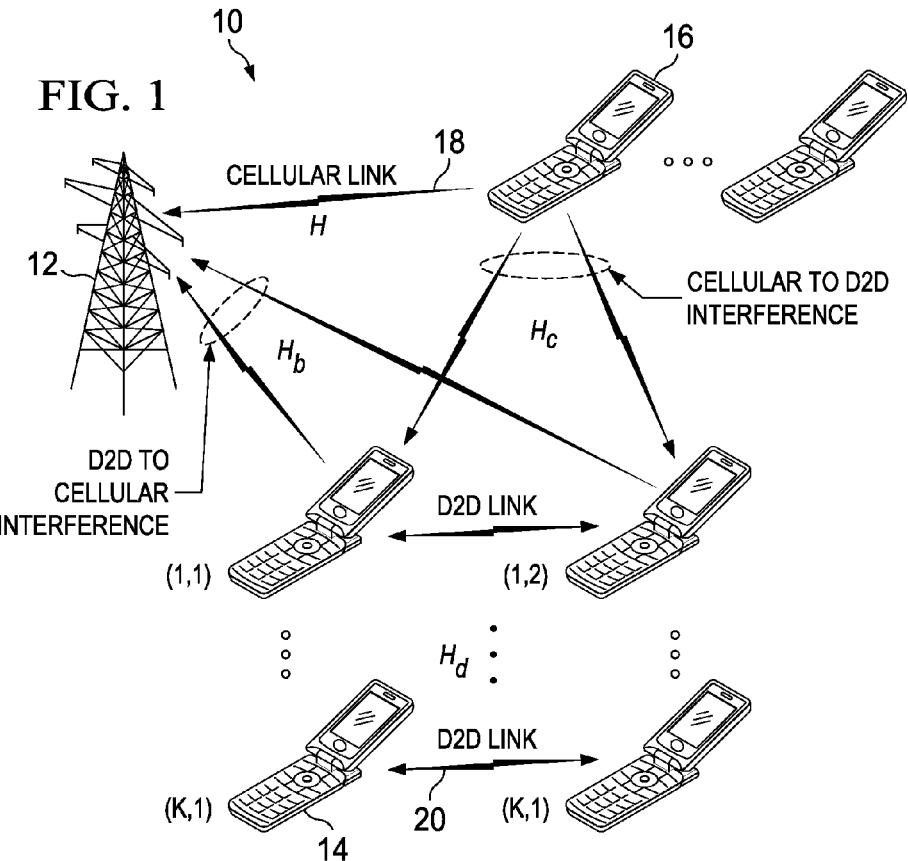
FIG. 1 illustrates an embodiment hybrid D2D-cellular network.

The present inventive concept is described herein with respect to example embodiments in a specific context, namely a hybrid D2D-cellular network 10 as illustrated in FIG. 1. The inventive concept may also be applied, however, to other networks that support multi-user communications such as a Long Term Evolution (LTE) network. As will be more fully explained below, the present disclosure addresses issues with interference management and resource allocation in, for example, a network like the hybrid D2D-celluarl network 10.

In other words, the degrees of freedoms (DoFs) within the D2D subsystem are improved by achieving interference alignment (IA) in the high-signal-to-noise (SNR) regime. In that regard, a beamformer and filter design scheme for D2D devices is proposed, subject to uncooperative interference from cellular UEs to D2D UEs. If all channel state information (CSI) is available, the transmit beamformers and receive filters can be computed iteratively.

In practice, the CSI is, of course, unavailable a priori. In lieu of estimating the CSI and then carrying out iterative optimization, the optimal beamformers and filters are directly estimated through bi-directional training. We also derive the condition of interference alignment, which should be satisfied by the number of D2D pairs, the number of cellular UEs, and the number of antennas in the hybrid D2D-cellular networks.

As shown in FIG. 1, the network 10, which may also be referred to as a single cell or a system, includes a base station 12 (BTS). The base station 12 may also be referred to as a controller, a communications controller, an evolved node B (eNB), and so on. The network 10 also includes K D2D UEs 14 (i.e., D2D UE pairs) and L cellular UEs 16, which share the same uplink spectrum. The D2D UEs 14 and the cellular UEs 16 may otherwise be known or referred to as a mobile, a tablet, a mobile station, a subscriber, a user, a terminal, a wireless node, and so on.

As shown in FIG. 1, the cellular UEs 16 are able to communicate with the base station 12 over cellular links 18. The D2D UEs 14 are also able to communicate with the base station (not shown) as well as directly with each other over a D2D link 20. Because the D2D UEs 14 are able to communicate directly with each other over the D2D links 20, some of the communications traffic of the base station 12 is offloaded, which reduces congestion at the base station 12.

The D2D UEs 14 communicate in a time division duplex (TDD) mode to transmit a single data stream to each other. Each of the cellular UEs 16 transmits a single data stream to the base station 12. Because both the D2D UEs 14 and the cellular UEs 16 share the same uplink band or channel, they will interfere with each other. Indeed, the network 10 will likely have interference among the D2D UE 14 pairs, from cellular UEs 16 to the D2D UE 14 pairs, and from the D2D UE 14 pairs to the base station 12 as shown in FIG. 1. As will be more fully explained below, interference may be satisfactorily mitigated or eliminated using cooperative beamforming within the D2D UE 14 subsystem.

For the purposes of discussion, it will be assumed that the base station 12 has N antennas and that the D2D UEs 14 and the cellular UEs 16 each have M antennas. The two D2D UEs 14 in the ith pair (i.e., the top pair in FIG. 1) are indexed by (i, 1) and (i; 2), where 1 refers to the D2D UE 14 on the left side and 2 represents the D2D UE 14 on the right side. The D2D UEs 14 (i, 1) and (i, 2) transmit during odd and even slots, respectively.

Still referring to FIG. 1, H(k) denotes the N×M uplink channel from the kth cellular UE 16 to the base station 12. Continuing, $H_c$ (i, k, 1) and $H_c$ (i, k, 2) denote the M×M interference channel from the kth cellular UE 16 to D2D UEs 14 (i, 1) and (i, 2), respectively. Further, $H_b$ (i,l) denotes the N×M interference channel from the D2D UE 14 (i,l) to the base station 12 and $H_d$ (i,j) denote the M×M channel from the D2D UE 14 (j, 1) to D2D UE 14 (i, 2). For the purposes of discussion, it is assumed that channel reciprocity holds for all Multiple Input Multiple Output (MIMO) channels in the system (e.g., the M×M channel from the D2D UE 14 (i, 2) to D2D UE 14 (j, 1) is $H_d(i,j)^\dagger$, where $H^\dagger$ is the conjugate transpose of matrix H.

In each time slot, the kth cellular UE 16 will transmit a single beam data symbols $x_c$(k) to the base station 12. D2D UE 14 (i, 1) and D2D UE 14 (i, 2) transmit single beam data symbols x(i, 1) and x(i, 2), respectively, to each other in a time-division duplex (TDD) manner. Given the above notations, the received signal y(i, 2) at D2D UE 14 (i, 2) is given by:

$$y(i,2)=\Sigma_{j=1}^{K}H_d(i,j)v(j,1)+\Sigma_{k=1}^{L}H_c(i,k,2)v_c(k)x_c(k)+n(i,2), \quad (1)$$

where v(j, 1) is the M×1 transmit beamformer for D2D UE 14 (j, 1), where $v_c$(k) is the M×1 transmit beamformer of the kth cellular UE, and where n(i, 2) is Gaussian noise at D2D UE 14 (i, 2). The estimate x̂(i, 1) of data symbol x(i, 1) is given by passing y(i, 2) through a M×1 receive filter g(i, 2):

$$\hat{x}(i,1)=g(i,2)^\dagger y(i,2). \quad (2)$$

Similarly, the received signal and estimate at D2D UE 14 (i, 1) are given by:

$$y(i,1)=\Sigma_{j=1}^{K}H_d(j,1)^\dagger v(j,2)x(j,2)+\Sigma_{k=1}^{L}H_c(i,k,1)v_c(k)x_c(k)+n(i,1), \quad (3)$$

and $$\hat{x}(i,2)=g(i,1)^\dagger y(i,1), \quad (4)$$

respectively. The base station 12 receives two sets of signals due to the TDD mode of D2D UE 14 pairs. The received signal $y_b$(l), l=1, 2, while D2D UE 14 (i,l), i=1, K are transmitting is given by:

$$y_b(l)=\Sigma_{k=1}^{L}H(k)v_c(k)x_c(k)+\Sigma_{i=1}^{K}H_b(i,l)v(i,l)x(i,l)+n_b. \quad (5)$$

From equations (1) and (3), each D2D UE 14 will receive D2D interference from other D2D UE 14 pairs and cellular interference from the cellular UEs 16. From equation (5), the base station 12 will receive interference from D2D UE 14 pairs. Since the base station is often equipped with more antennas than the UEs (N≥M), it can easily cancel the interference from D2D UE 14 pairs.

Figure 2:
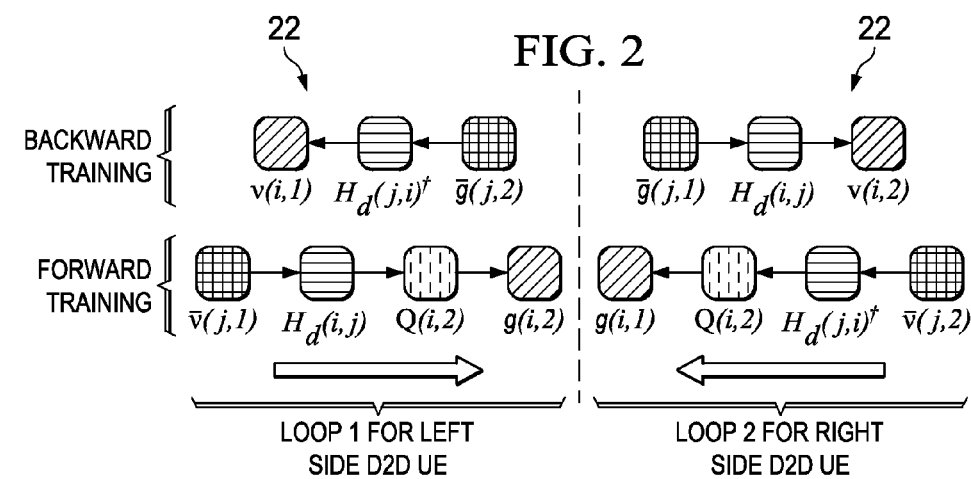
FIG. 2 provides an embodiment bi-directional beamforming method for use with the network of FIG. 1.

Next, a bi-directional beamforming method 22 as schematically illustrated in FIG. 2 is performed. During such process, it is assumed that CSI is known to all D2D UEs 14. In an embodiment, the bi-directional beamforming process optimizes the transmit beamformers and receives filters in order to increase (and perhaps maximize) the sum rate of the D2D UE 14 subsystem, which is subject to uncooperative interference from cellular UEs 16. In the high SNR regime, where performance is limited by D2D interference and cellular interference, the maximum sum rate is achieved by interference alignment in the D2D UE 14 subsystem. Interference alignment expects that at each D2D UE 14, both the D2D interference and the cellular interference in the received signal are removed after passing through the receive filter, which leaves only a scaled desired signal and thermal noise.

In an embodiment, transmissions from the odd numbered D2D UEs 14 (i, 1) to the even numbered D2D UEs 14 (i, 2) are referred to as the forward direction. In contrast, transmissions from the even numbered D2D UEs 14 (i, 2) to the odd numbered D2D UEs 14 (i, 1) are referred to as the backward direction. Thus, the interference alignment for the forward direction is:

$$g(l,2)^\dagger H_d(i,i)v(l,1)\neq 0, \forall i=1,\ldots,K, \quad (6a)$$

$$g(l,2)^\dagger H_d(i,j)v(j,1)=0, \forall i,j=1,\ldots,K\ i\neq j, \quad (6b)$$

$$g(l,2)^\dagger H_c(i,k,2)v_c(k)=0, \forall i=1,\ldots,K\ k=1,\ldots,L. \quad (6c)$$

The interference alignment for the backward direction is:

$$g(i,1)^\dagger H_d(i,i)^\dagger v(i,2)\neq 0, \forall i=1,\ldots,K, \quad (7a)$$

$$g(i,1)^\dagger H_d(j,i)^\dagger v(j,2)=0, \forall i,j=1,\ldots,K\ i\neq j \quad (7b)$$

$$g(i,1)^\dagger H_c(i,k,1)v_c(k)=0, \forall i=1,\ldots,K\ k=1,\ldots,L. \quad (7c)$$

A feasibility condition of interference alignment in hybrid D2D-cellular networks 10 is determined with Rayleigh fading. The derivation is performed by counting the number of equations and the number of variables in the multivariate polynomial system formed by equations (6) and (7). By way of example, the hybrid D2D-cellular system 10 with K D2D UE 14 pairs and L cellular UEs 16, where all D2D UEs 14 and cellular UEs 16 are equipped with M antennas for single beam transmission, has interference alignment solutions with a probability of one if:

$$K \leq 2M-L-1. \quad (8)$$

Given the feasibility condition noted above, it remains to find the interference alignment solution for feasible hybrid D2D-cellular systems 10. In an embodiment, the b-directional beamforming method 22, the flow of which is illustrated in FIG. 3, may be implemented for the hybrid D2D-cellular network 10. Because the D2D UEs 14 generally operate in a signal subspace orthogonal to the uncooperative cellular interference, the method 22 begins at block 24 by calculating the cellular interference from the L cellular UEs 16 to each D2D UE 14. The interference subspace at D2D UE 14 (i,l) is given by:

$$A(i,l) = [H_c(i,1,l)v_c(1), \ldots, H_c(i,L,l)v_c(L)]. \quad (9)$$

Based on the A(i,l), at block 26 the orthogonal projection matrix for the D2D UE 14 (i,l) is given by:

$$Q(i,l) = I_M - A(i,l)[A(i,l)^\dagger A(i,l)]^{-1}A(i,l)^\dagger, \quad (10)$$

Starting with random initialized receive filters, at block 28 the transmit beamformers and the receive filters are iteratively updated for both the forward and backward directions. To update the transmit beamformers, the sum of the signal, the D2D interference, and the noise covariance matrix is obtained by:

$$B_v(i,2) = \Sigma_{j=1}^K H_d(i,j)\bar{g}(j,1)\bar{g}(j,1)^\dagger H_d(i,j)^\dagger + \Sigma(i,2), \quad (11a)$$

$$B_v(i,1) = \Sigma_{j=1}^K H_d(j,i)^\dagger \bar{g}(j,2)\bar{g}(j,2)^\dagger H_d(j,i) + \Sigma(i,1), \quad (11b)$$

where $\Sigma(i,l)$ is the noise covariance matrix at D2D UE 14 (i,j) and $$\bar{g}(j,l) = \frac{g(i,l)}{\|g(i,l)\|}.$$

The transmit beamformer update is given by:

$$v(i,2) = B_v(i,2)^{-1}H_d(i,i)\bar{g}(i,1), \quad (12a)$$

$$v(i,1) = B_v(i,1)^{-1}H_d(i,i)^\dagger \bar{g}(i,2), \quad (12b)$$

For the receive filter update, the sum of the signal, the interference, and the noise covariance matrices are projected onto the orthogonal subspace using matrices in equation (10):

$$B_g(i,2) = Q(i,2)(\Sigma_{j=1}^K H_d(i,j)\bar{v}(j,1) \bar{v}(j,1)^\dagger H_d(i,j)^\dagger + \Sigma(i,2))Q(i,2), \quad (13a)$$

$$B_g(i,1) = Q(i,1)(\Sigma_{j=1}^K H_d(j,i)^\dagger \bar{v}(j,2) \bar{v}(j,2)^\dagger H_d(j,i) + \Sigma(i,1))Q(i,1), \quad (13b)$$

The covariance matrix $B_g(i,l)$ is degenerate due to the orthogonal projection. Therefore, $[B_g(i,l)]^+$ is used to denote the unique Moore-Penrose pseudo-inverse. The receive filter update is given by:

$$g(i,2) = B_g(i,2)^+ Q(i,2) H_d(i,i) \overline{v(i,1)}, \quad (14a)$$

$$g(i,1) = B_g(i,1)^+ Q(i,1) H_d(i,i)^\dagger \overline{v(i,2)}. \quad (14b)$$

In an embodiment, the transmit beamformers may be normalized by $$v(i,l) = \frac{v(i,l)}{\|v(i,l)\|}.$$

In FIG. 4, an embodiment algorithm 30 capable of performing the method 22 is illustrated. In other embodiments, different algorithms written in different languages may be implemented in order to effectuate the concepts disclosed herein.

According to numerical results, the method 22 converges to an interference alignment solution for a feasible system. Indeed, the method 22 provides the interference alignment with one transmit beamformer update for the case of K≤M, as long as the feasibility condition of equation (8), above, is satisfied (e.g., K=3, L=1, M=3). This proposition is easily verified using the following rationale.

For the forward direction, the randomly initialized g(i, 2), i=1, . . . , K, are linearly independent with probability one. After passing through the generic MIMO channels, the K received beams at each transmitter i from K different receivers, i.e., $H(i,j)g(j,2)$, j=1, . . . , K, are linearly independent with probability one. Because at each transmitter i there are M≥K dimensions, one minimum mean square (MMSE) transmit beamformer update for v(i,1), i=1, . . . , K, is enough to distinguish the desired beam from other K−1 interfering beams. Given the reciprocity within the D2D UE 14 pairs, using this v(i,1), l=1, . . . , K, the K D2D beams at each receiver are aligned and the desired signal lies in the orthogonal subspace of the cellular interference. Similar rationale explains the backward direction.

In an embodiment, the difference between hybrid D2D-cellular networks 10 and interference networks is the uncooperative cellular interference. Without equations (6c) and (7c), equations (6) and (7) are simply the interference alignment requirements for interference networks. Given reciprocity of the channels, if v(i,1), . . . , v(K,1) and g(1,2), . . . , g(K,2) satisfy equations (6a) and (6b), then having g(i,1)=v(i,1) and v(i,2)=v(i,2) for i=1, . . . , K will automatically satisfy equations (7a) and (7b). This suggests that one set of transmit beamformers and receive filters are enough to achieve interference alignment for interference networks. Due to the existence of uncooperative cellular interference in equations (6c) and (7c), two sets of transmit beamformers and receive filters are used to achieve the feasibility condition in equation (8).

The method 22 employs channel state information (CSI), which is generally unknown a priori. Therefore, a least square training-based solution corresponding to the bi-directional beamforming method 32 as shown in FIG. 5 may be implemented. The method 32 of FIG. 5 is similar to the bi-directional training method 22 of FIG. 3. However, the method 32 estimates the transmit beamformers and the receive filters directly by sending training symbols in the two transmit directions iteratively without knowledge of the channel state information. If the training symbols are sent using v's as transmit beamformers, it is referred to as forward training. If the training symbols are sent using g's as transmit beamformers, it is referred to as backward training. The training-based method 32 presumes that the channels are stable during the training period and the actual data transmission period.

In block 34 of FIG. 5, the method 32 begins with each cellular UE 16 sending T training symbols for each D2D UE 14 (i,l) to sense the cellular interference:

$$y(i,l) = \Sigma_{k=1}^L H_c(i,k,l)v_c(k)x_c(k) + N(i,l), \quad (15)$$

where $x_c(k)$ is a 1×T vector representing T random training symbols sent from the kth cellular UE and N(i,l) is the M×T Gaussian noise at D2D UE 14 (i,l). Based on y(i,l), at block 36 the interference subspace is given by:

$$A(l,l) = \Xi_L[y(i,l)y(i,l)^\dagger], \quad (16)$$

where $\Xi_L[H]$ is the M×L matrix, whose columns are the L eigenvectors corresponding to the L largest eigenvalues of H. At block 38, the orthogonal projection matrix to this interference subspace is calculated using equation (10). For the transmit beamformer estimation, the two D2D UEs 14 of each pair will alternatively send T training symbols to each other using the normalized receive filters as "transmit beamformers." At the receiving end, each D2D UE 14 will exclude the cellular interference, which is realized in time or code division. Thus, the received signals at the D2D UEs 14 (i,1) and (i,2) are given by:

$$y_v(i,2) = \sum_{j=1}^{K} H_d(i,j) \bar{g}(j,1) x(j,1) + N(i,2), \quad (17a)$$

$$y_v(i,1) = \sum_{j=1}^{K} H_d(i,j) \bar{g}(j,2) x(j,2) + N(i,1), \quad (17b)$$

where x(j,l) is a 1×T vector representing the T training symbols sending from D2D UE 14 (i,l). The estimate of the transmit beamformers at D2D UEs 14 (i,1) and (i,2) are given by:

$$v(i,2) = [y_v(i,2) y_v(i,2)']^{-1} y_v(i,2) x(i,1)', \quad (18a)$$

$$v(i,1) = [y_v(i,1) y_v(i,1)']^{-1} y_v(i,1) x(i,2)', \quad (18a)$$

Upon updating the transmit beamformers, the two D2D UEs 14 of each pair will alternatively send T training symbols to each other using the normalized updated transmit beamformers in order to estimate the receive filters. At the receiving end, cellular interference does not need to be excluded. However, the received signal is projected on the orthogonal subspace:

$$y_g(i,2) = Q(i,2)[\sum_{j=1}^{K} H_d(i,j) \\ \bar{v}(j,1) x(j,1) + \sum_{k=1}^{L} H_c(i,k,2) v_c(k) x_c(k) + N(i,2)], \quad (19a)$$

$$y_g(i,2) = Q(i,2)[\sum_{j=1}^{K} H_d(i,j) \\ \bar{v}(j,1) x(j,1) + \sum_{k=1}^{L} H_c(i,k,2) v_c(k) x_c(k) + N(i,2)]. \quad (19b)$$

The estimate of receive filters at D2D UEs 14 (i,1) and (i,2) are:

$$g(i,2) = [y_g(i,2) y_g(i,2)']^{-1} y_g(i,2) x(i,1)', \quad (20a)$$

$$g(i,1) = [y_g(i,1) y_g(i,1)']^{-1} y_g(i,1) x(i,2)'. \quad (20b)$$

Notably, the above assumes that the covariance matrix $[y_g(i,l) y_g(i,l)']$ is lower ranked due to the orthogonal projection. Therefore, $[y_g(i,l) y_g(i,l)']^{-1}$ means the Moore-Penrose pseudoinverse.

At block 40, the method 32 iterates between transmit beamformer update and receive filter update for both forward and backward directions until they have converged. It can be easily proved that this least square training based process converges to the same result using method 32 as the training length approaches infinity. The method 32 preserves the fast convergence property of method 22 (FIG. 3). However, the method 32 distinguishes the D2D interference and the cellular interference in the transmit beamformer update stage, which in principle doubles the training length.

Because an assumption is made that all cellular interferers are dominant, orthogonal projection is optimal. In practice, after the sensing stage 34 in method 32, the orthogonal subspace at D2D UE 14 (i,l) may be decided according to the eigenvalues of the covariance matrix $[y(i,l) y(i,l)^{-1}]$ in equation (16). The orthogonal projection only needs to be applied to those eigenvectors, whose eigenvalues are significantly larger than the noise level. This change along with the interference alignment feasibility condition may adaptively decide the number of closely located D2D pairs K that can be assigned to the same resource block.

In FIG. 6, an embodiment algorithm 42 capable of performing the method 32 is illustrated. In other embodiments, different algorithms written in different languages may be implemented in order to effectuate the concepts disclosed herein.

Figure 7:
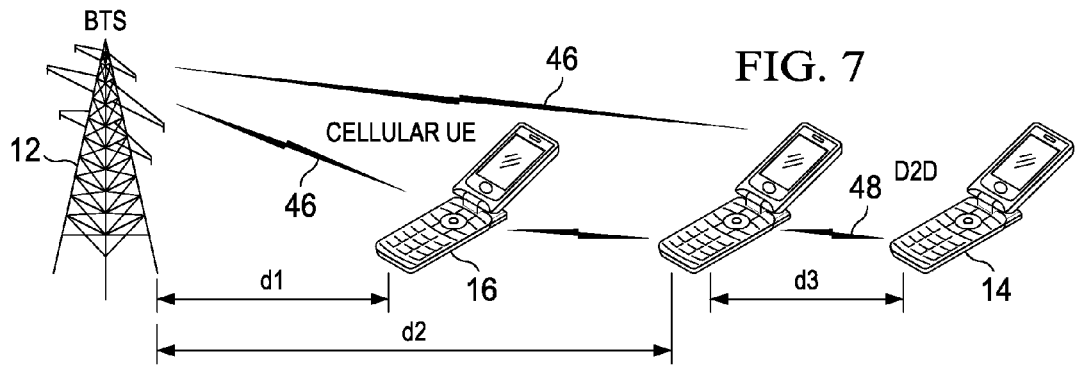
FIG. 7 illustrates an embodiment simplified one-dimensional network with pathloss.

Referring now to FIG. 7, a simplified one-dimensional network 44 is illustrated. In FIG. 2, for the pathloss 46 from the base station 12 to the D2D UE 14 pairs and the base station 12 to the cellular UE 16, the Hanta model is employed. For the pathloss 48 between the D2D UEs 14 and the pathloss 48 from D2D UEs 14 to cellular UE 16 the free space line of sight model is used. For the purposes of discussion, let $d_1$ denote the distance between the base station 12 and L cellular UEs 16 (one of which is illustrated in FIG. 7), let $d_2$ denote the distance between the base station 12 and K D2D UE 14 pairs (one of which is illustrated in FIG. 7), and let $d_3$ denote the distance between any two D2D UE 14 devices. The distance parameters, $d_1$, $d_2$ and $d_3$ are varied in FIG. 7 to simulate the performance of the method 32. For illustrative purposes, the results are presented for K=3, M=3, L=1 and $d_3$=50 m.

Figure 8A:
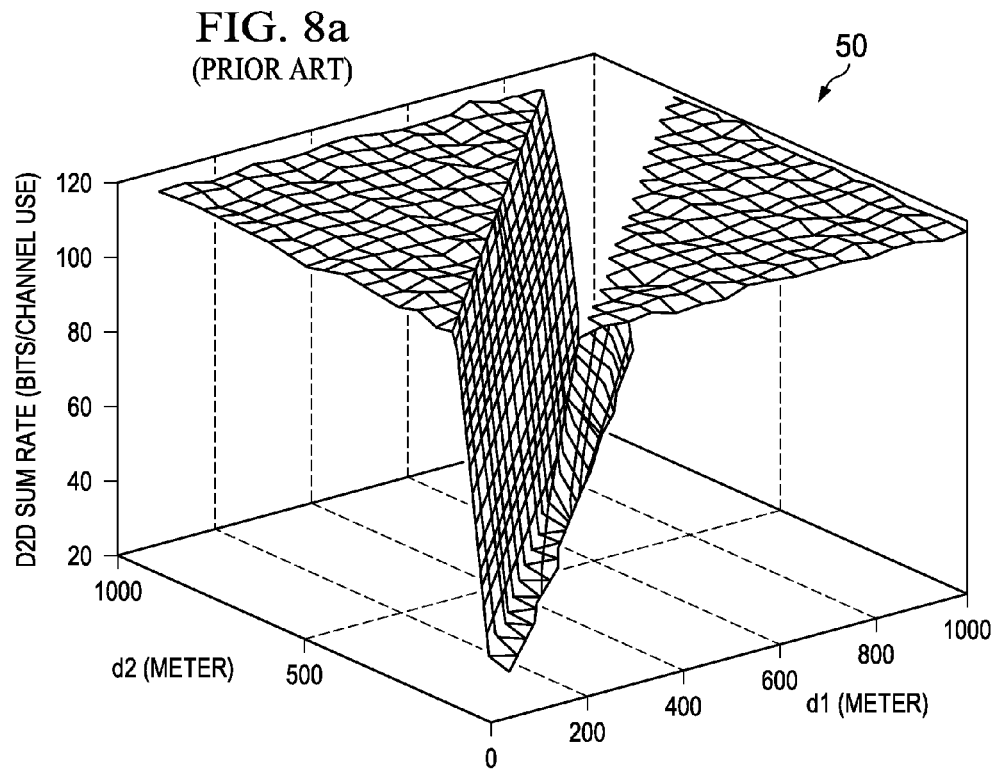
FIGS. 8(a)-(c) illustrate simulated D2D UE sum rates using conventional methods and the method of FIG. 3.
Figure 8B:
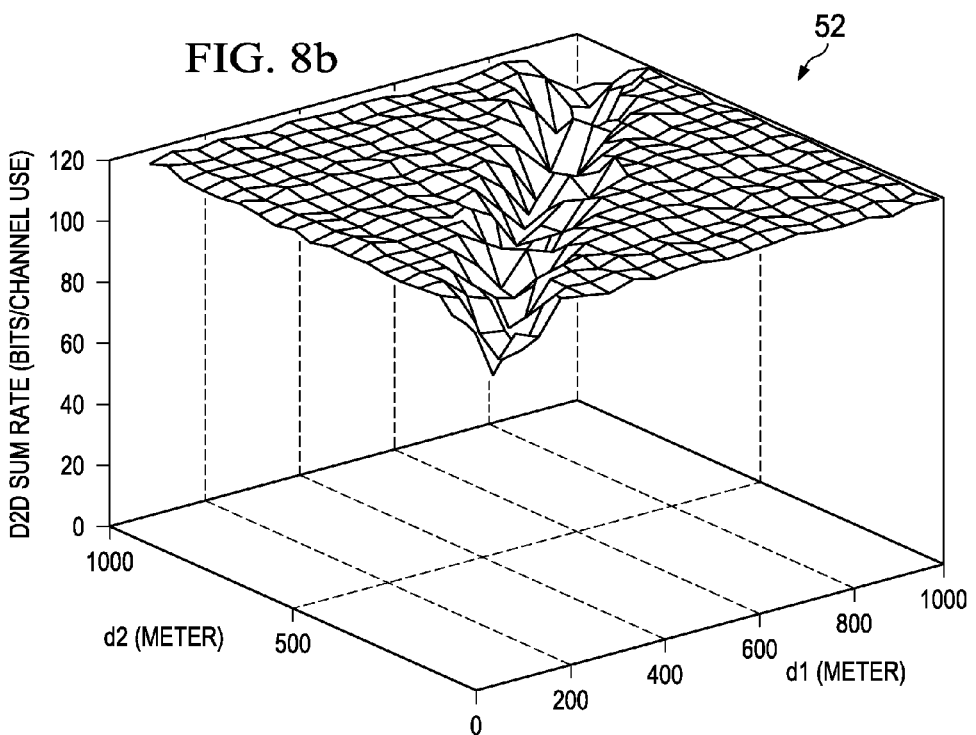
Figure 8C:
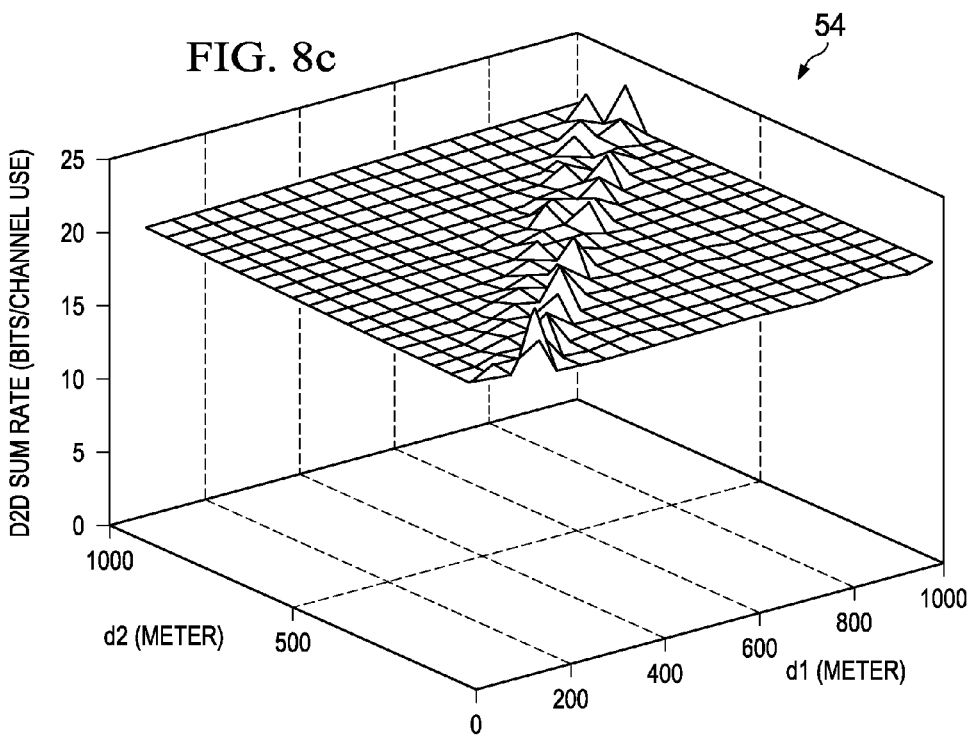

The noise level at all receive ends is −100 dBm, the transmit power of the cellular UE 16 is 20 dBm, and the peak transmit power of the D2D UEs 14 is 20 dBm. The D2D sum rates using conventional methods and those disclosed herein are shown in FIGS. 8a-8c. The D2D sum rate 50 using the maximum Signal to Interference plus Noise Ratio (SINR) method in the prior art, which only aligns D2D interference, is shown in FIG. 8a.

In contrast, The D2D sum rate 52 using the method 22 is shown in FIG. 8b. FIG. 8(c) shows the D2D sum rate 54 using the method 22 with a basic power control scheme. The power control strategy here is to achieve a certain received SINR by controlling the transmit power of the D2D UEs 14. Comparing FIG. 8(a) to FIG. 8(b), the method 22 significantly increases the D2D sum rate 52 by aligning both D2D and the cellular interference when the D2D UE 14 pairs and the cellular UEs 16 are close, usually within 200 meters. If method 32 is used instead, the training length needs to be greater than the actual parameters to be estimated, which is M (K+L). By setting the objective received SINR as 20 dB, the power control scheme achieves 20 bits per channel used together with the method 32.

Figure 9A:
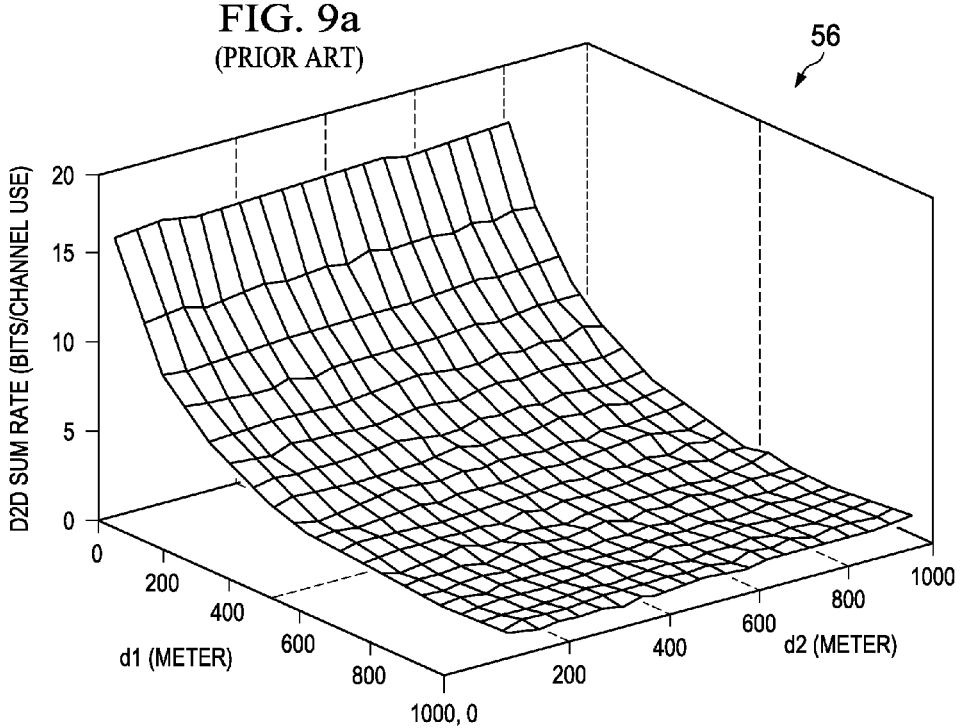
FIGS. 9(a)-(c) illustrate simulated cellular sum rates using conventional methods and the method of FIG. 3.
Figure 9B:
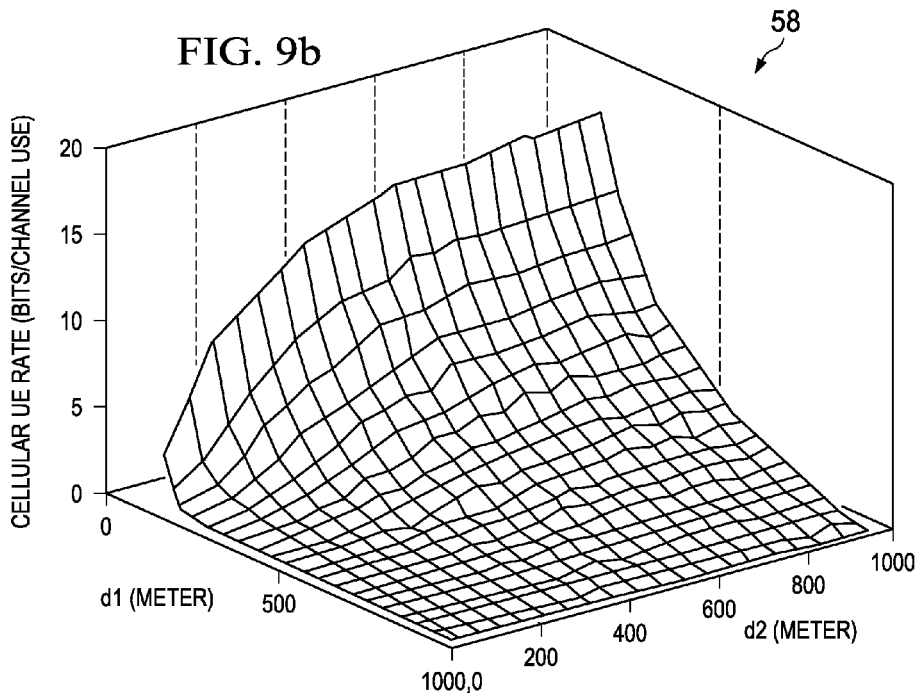
Figure 9C:
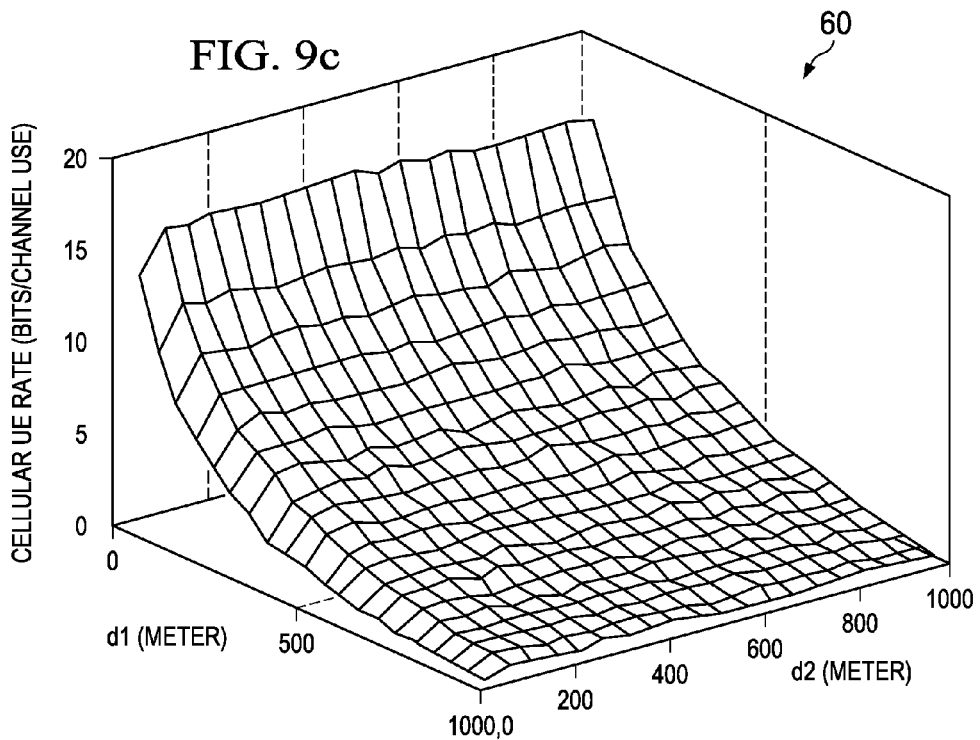

The cellular UEs 16 sum rates using conventional methods and the method 22 disclosed herein are simulated in FIGS. 9a-9c. To begin, FIG. 9(a) shows the cellular UE's 16 sum rate 56 without interference from the three D2D UE 14 pairs. Next, FIG. 9(b) shows the cellular UE's 16 sum rate 58 when the D2D UEs 14 use the interference alignment transmit beamformers and receive filters described, for example, in the method 22. FIG. 9(c) shows the cellular UE's 16 sum rate 60 with interference alignment transmit beamformers and receive filters of the method 22 along with power control. Comparing FIG. 9(a) to FIG. 9(b), the cellular UE's 16 sum rate begins to diminish as the D2D UE 14 pairs get within 300 meters of the base station 12. The result in FIG. 9(c) suggests that the D2D interference at the base station 12 can be properly managed by the power control scheme.

Figure 10:
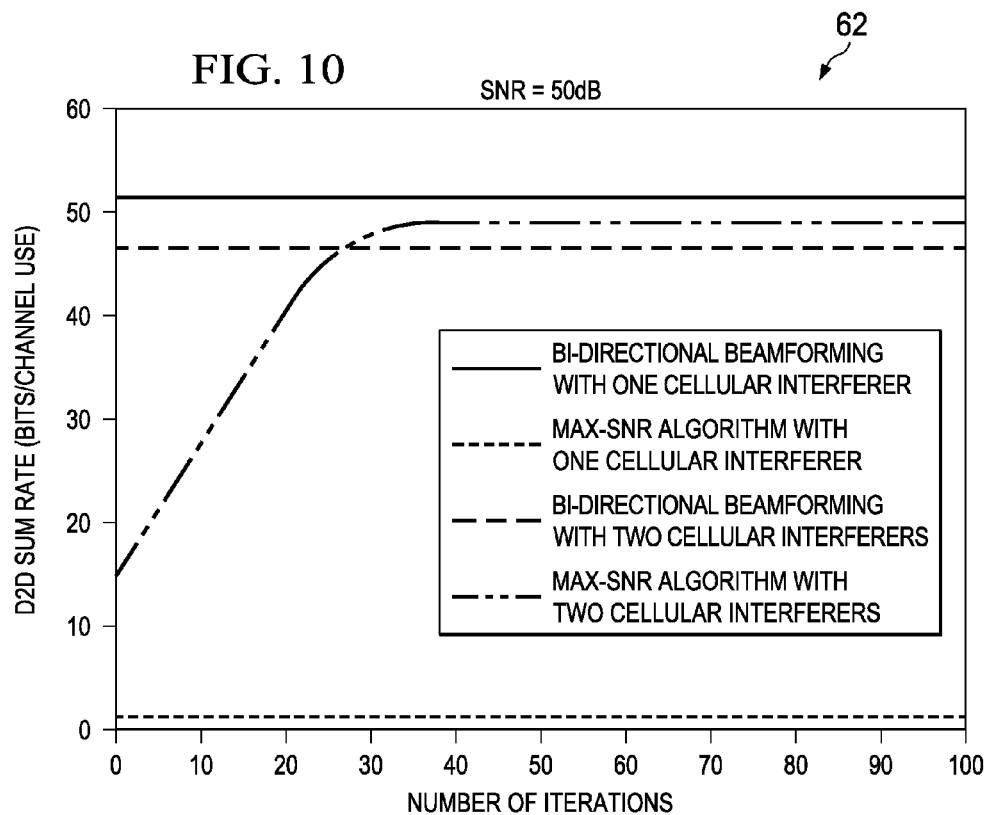
FIG. 10 illustrates simulated numerical results supporting the feasibility condition and fast convergence property for the method of FIG. 3.

In FIG. 10, simulated numerical results 62 supporting the feasibility condition and fast convergence property are illustrated. In this simulation, the pathloss is ignored. By setting the signal-to-noise ratio (SNR) at 50 dB, the system is in the high-SNR regime. The results are achieved by running the max-SINR algorithm and the method 22 for one random channel realization. The curves with cross markers are results using the max-SINR algorithm, while the curves without any markers are from the method 22. For the solid curves, the settings are M=3, K=3, and L=1. For the dashed curves, the settings are M=3, K=3, and L=2. According to the solid curves, the method 22 is able to reach alignment after a single iteration. In contrast, the max-SINR algorithm uses several more iterations to converge. The number of iterations needed for the max-SINR algorithm to converge and the resulted sum rate for the methods 22, 32 depends on initializations and channel realizations. For the dashed curves, the method 22 still achieves alignment, while the max-SINR algorithm fails. This proves the feasibility condition in equation (8).

Figure 11:
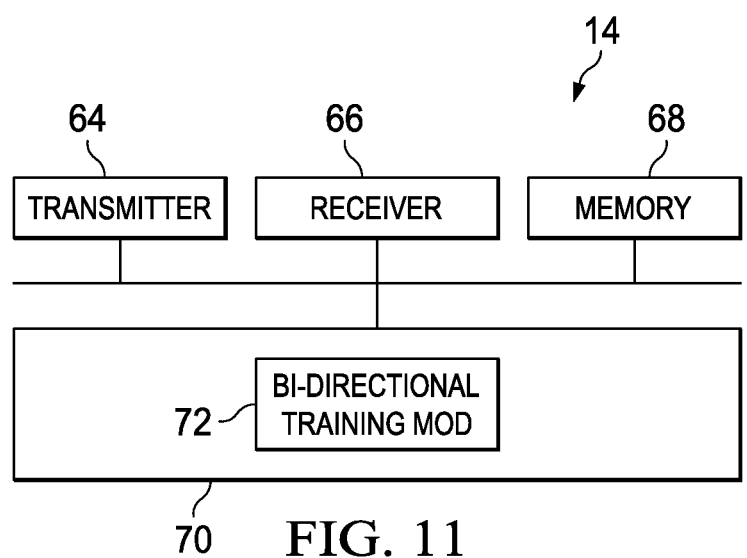
FIG. 11 illustrates an embodiment D2D UE of FIG. 1 in further detail.

In FIG. 11, an embodiment D2D UE 14 of FIG. 1 is illustrated in further detail. As shown, the D2D UE 14 includes a transmitter 64 configured to transmit signals, a receiver 66 configured to receive signals, and a memory 68 configured to store data and instructions. The transmitter 64, receiver 66, and memory 68 are operatively coupled to a processor 70 or other logic device. While the memory 68 and processor 70 are illustrated in one block in FIG. 11, the memory 68 and/or the processor 70 may be formed from several independent memory blocks and processing units in practical applications.

In an embodiment, when executed by the processor 70, a bi-directional training module 72 is configured to calculate an interference subspace from the cellular UE 16 to each of the D2D UEs 14 in the D2D UE pair, to calculate an orthogonal projection matrix based on the interference subspace calculated, and to iteratively update receive filters through forward training and transmit beamformers through backward training after the orthogonal projection matrix is calculated to align the D2D UEs. In an embodiment, the updating of the receive filters through forward training is directly based upon the orthogonal projection matrix. In an embodiment, the updating of the transmit beamformers through backward training is performed after the updating of the receive filters through forward training.

In an embodiment, when executed by the processor 70, a bi-directional training module 72 is configured to send training symbols to sense interference from the cellular UE 16, to calculate an interference subspace from the cellular UE 16 to each of the D2D UEs 14 in the D2D UE pair, to calculate an orthogonal projection matrix based on the interference subspace calculated, and to iteratively update receive filters through forward training and transmit beamformers through backward training after the orthogonal projection matrix is calculated to align the D2D UEs. In an embodiment, the updating of the receive filters through forward training is directly based upon the orthogonal projection matrix. In an embodiment, the updating of the transmit beamformers through backward training is performed after the updating of the receive filters through forward training.

Although shown as a single module, the bi-directional training module 72 may be implemented through several separate and discrete modules configured to operate independently in the processor 70. In addition, embodiments of the present disclosure may be implemented using software, hardware, firmware, and combinations thereof.

The methods disclosure herein with regard to D2D 14 UEs and the cellular UE 16 may be expanded and/or applicable to other communications systems and devices. For example, a communication link may be established between a UE and a network controller which is for example, a macro cell, a low power node (LPN), a relay node, a pico cell, a femto cell, and so on. The communication link may be, for example, a wireless backhaul link between a network controller and a network entity acting as a gateway, router, and so on. The communication link may also be a direct communication link between two or more UEs. Among these communication links that share the same communication resources, there may exist cooperation of transmission and/or reception among a subset of links to manage the interference while the interference from the rest of the links is coped with in a less cooperative way, for example, by a receiver with the capability of interference suppression. For example, the cooperative links may include wireless backhaul links while the communication between other network controllers and UEs may cause uncooperative interference. As another example, there may be cooperation within a subset of network controllers and the UEs associated with them while the communication between other network controllers and their associated UEs may cause uncooperative interference. As yet another example, there may be cooperation between direct communication links of D2D UEs while the neighboring cellular UEs may cause uncooperative interference.

While the disclosure has been made with reference to illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A method of managing interference in a network including a first communication device and pairs of second communication devices, comprising:
calculating an interference subspace from the first communication device to each of the second communication devices;
calculating an orthogonal projection matrix based on the interference subspace calculated; and
iteratively updating receive filters through a forward training and transmit beamformers through backward training after the orthogonal projection matrix is calculated to align the pairs of second communication devices.

2. The method of claim 1, wherein the first communication device is at least one of a relay node, a macro cell, a pico cell, and a femto cell.

3. The method of claim 1, wherein the first communication device comprises one or more cellular user equipments (UEs) and the pairs of second communication devices comprise device-to-device UE (D2D UE) pairs.

4. The method of claim 3, wherein a received signal at one of the D2D UEs is represented by $$y(i,2)=\Sigma_{j=1}^{K}H_d(i,j)v(j,1)x(j,1)+\Sigma_{k=1}^{L}H_c(i,k,2)v_c(k)x_c(k)+n(i2).$$

5. The method of claim 4, wherein the received signal at another one of the D2D UEs is represented by $$y(i,1)=\Sigma_{j=1}^{K}H_d(j,i)'v(j,2)x(j,2)+\Sigma_{k=1}^{L}H_c(i,k,1)v_c(k)x_c(k)+n(i1).$$

6. The method of claim 3, wherein a forward direction represents transmissions from odd numbered ones of the D2D UEs to even numbered ones of the D2D UEs.

7. The method of claim 3, wherein a backward direction represents transmissions from even numbered ones of the D2D UEs to even numbered ones of the D2D UEs.

8. The method of claim 1, wherein the updating of the receive filters through forward training is directly based upon the orthogonal projection matrix.

9. The method of claim 8, wherein the updating of the transmit beamformers through backward training is performed after the updating of the receive filters through forward training.

10. The method of claim 1, further comprising normalizing the transmit beamformers.

11. The method of claim 1, further comprising achieving convergence after a single iteration.

12. The method of claim 1, wherein an interference alignment for a forward direction is $$g(i,2)'H_d(i,i)v(i,1)\neq 0, \forall i=1,\ldots,K, \text{ and}$$

$$g(i,2)^{\dagger}H_d(i,j)v(j,1)=0, \forall i,j=1,\ldots,K\ i\neq j, \text{ and}$$

$$g(i,2)'H_c(i,k,2)v_c(k)=0, \forall i=1,\ldots,K\ k=1,\ldots,L.$$

13. The method of claim 1, wherein an interference alignment for a backward direction is $g(i,1)'H_d(i,i)'v(i,2) \neq 0, \forall i=1,\ldots,K$, and $g(i,1)^\dagger H_d(j,i)'v(j,2)=0, \forall i,j=1,\ldots,K\ i \neq j$, and $g(i,1)'H_c(i,k,1)v_c(k)=0, \forall i=1,\ldots,K\ k=1,\ldots,L$.

14. The method of claim 1, further comprising maintaining a feasibility condition represented by $K \leq 2M-L-1$.

15. The method of claim 1, wherein the interference subspace is determined by $A(i,l)=[H_c(i,1,l)v_c(1),\ldots,H_c(i,L,l)v_c(L)]$.

16. The method of claim 1, wherein the orthogonal projection matrix is determined by $Q(i,l)=I_M - A(i,l)[A(i,l)'A(i,l)]^{-1}A(i,l)'$.

17. The method of claim 1, wherein the transmit beamformers are updated based on at least one of $v(i,2)=B_v(i,2)^{-1}H_d(i,i)\overline{g}(i,1)$ and $v(i,1)=B_v(i,1)^{-1}H_d(i,i)\overline{g}(i,2)$.

18. The method of claim 17, wherein the transmit beamformers are updated based on at least one of $B_v(i,2)=\Sigma_{j=1}^K H_d(i,j)\overline{g}(j,1)\overline{g}(j,1)'H_d(i,j)'+\Sigma(i,2)$ and $B_v(i,1)=\Sigma_{j=1}^K H_d(j,i)'\overline{g}(j,2)\overline{g}(j,2)'H_d(j,i)+\Sigma(i,1)$.

19. The method of claim 1, wherein the receive filters are updated based on at least one of $g(i,2)=B_g(i,2)^+ Q(i,2)H_d(i,i)\overline{v(i,1)}$ and $g(i,1)=B_g(i,1)^+ Q(i,1)H_d(i,i)\overline{v(i,2)}$.

20. The method of claim 19, wherein the receive filters are updated based on at least one of $B_g(i,2)=Q(i,2)(\Sigma_{j=1}^K H_d(i,j)\overline{v}(j,1)\overline{v}(j,1)'H_d(i,j)'+\Sigma(i,2))Q(i,2)$, and $B_g(i,1)=Q(i,1)(\Sigma_{j=1}^K H_d(j,i)\overline{v}(j,2)\overline{v}(j,2)'H_d(j,i)+\Sigma(i,1))Q(i,1)$.

21. A computer readable medium containing program instructions for managing interference in a network including cellular user equipments (UE) and device-to-device UE (D2D UE) pairs, wherein execution of the program instructions by one or more processors of a computer system causes the one or more processors to carry out the steps of:
sending training symbols to sense interference from the cellular UEs;
calculating an interference subspace from the cellular UEs to each of the D2D UEs;
calculating an orthogonal projection matrix based on the interference subspace calculated; and
iteratively updating receive filters through forward training and transmit beamformers through backward training after the orthogonal projection matrix is calculated to align the D2D UEs.

22. The computer readable medium of claim 21, wherein the updating of the receive filters through forward training is directly based upon the orthogonal projection matrix.

23. The computer readable medium of claim 22, wherein the updating of the transmit beamformers through backward training is performed after the updating of the receive filters through forward training.

24. The computer readable medium of claim 21, further comprising normalizing the transmit beamformers.

25. The computer readable medium of claim 21, further comprising achieving convergence after a single iteration.

26. The computer readable medium of claim 21, wherein the interference subspace is calculated using $A(i,l)=\Xi_L[y(i,l)y(i,l)']$.

27. The computer readable medium of claim 21, further comprising projecting a received signal on an orthogonal subspace.

28. The computer readable medium of claim 21, further comprising estimating the receive filters for each of the D2D UEs in each of the D2D UE pairs.

29. A device-to-device user equipment (D2D UE) forming part of a D2D UE pair, comprising:
a processor operatively coupled to a transmitter, to a receiver, and to memory; and
a bi-directional training module stored in memory that, when executed by the processor, is configured to calculate an interference subspace from multiple cellular UEs to each of the D2D UEs in the D2D UE pair, to calculate an orthogonal projection matrix based on the interference subspace calculated, and to iteratively update receive filters through forward training and transmit beamformers through backward training after the orthogonal projection matrix is calculated to align the D2D UEs.

30. The D2D UE of claim 29, wherein the bi-directional training module is configured to calculate the interference subspace based on at least one of $A(i,l)=[H_c(i,1,l)v_c(1),\ldots,H_c(i,L,l)v_c(L)]$ and $A(i,l)=\Xi_L[y(i,l)y(i,l)']$.

31. The D2D UEs of claim 29, wherein the bi-directional training module is configured to sense interference from a cellular UE prior to calculating an interference subspace from the cellular UE to each of the D2D UEs in the D2D UE pair and to send training symbols for iteratively aligning the interference within D2D pairs.

32. The D2D UE of claim 29, wherein the orthogonal projection matrix is calculated based on $Q(i,l)=I_M - A(i,l)[A(i,l)'A(i,l)]^{-1}A(i,l)'$.

* * * * *